United States Patent Office 3,295,985
Patented Jan. 3, 1967

3,295,985
PROCESS FOR THE PRODUCTION OF SUBSTANTIALLY FAT FREE AND FLAVOR FREE PROTEINACEOUS FOODSTUFFS
John Charles Cavanagh, 168 Adelaide Terrace, Perth, Western Australia, Australia
No Drawing. Filed Dec. 6, 1965, Ser. No. 512,004
Claims priority, application Australia, Nov. 21, 1960, 66,735/60
6 Claims. (Cl. 99—17)

The present application is a continuation-in-part of applicant's copending application, Serial No. 153,670, filed November 20, 1961, and now abandoned.

The present invention relates to a process for the production of substantially fat-free and flavor-free proteinaceous foodstuffs from relatively dry proteinaceous starting materials of vegetable origin and to the economic recovery of the oils therefrom.

The object of the invention is to produce a process of removing water, fats, coloring matter, flavors, odors, oils and other components without damage of proteins or oils from a wide range of flavored or odoriferous materials of vegetable origin to produce a valuable solid product of good keeping quality containing protein and/or carbohydrates and/or other solid matter in a substantially tasteless or odorless condition suitable for use as a food for humans and/or animals. The fats and other components may be recovered as principal or as byproducts.

The present invention is an extension of the invention of United States Patent No. 3,076,708.

The former invention relates to a process for the production of protein enriched material from protein containing material having a relatively high water content. The process consists in treating the protein-containing material in counterflow with an organic solvent or a mixture of solvents under conditions which remove the water as well as the fat in the protein-containing material and which are also found to remove substantially the flavor or taste and smell components. The treated or solid end-product is a protein product substantially free from water, fat and flavor components.

The invention revealed in said patent is particularly applicable to meat and fish products which have not been previously subjected to dehydration or other processing, while the present invention allows of extension of the former process to a wide range of materials of vegetable origin. The present invention is directed to the treatment of relatively dry materials, that is, materials with a low, as distinct from high, water content.

The process of the former invention of United States Patent No. 3,076,708 is as follows:

The ingoing material in a comminuted form is treated in counter-flow with an organic solvent or mixture of solvents capable of mixing with water and capable of dissolving fat and having a boiling point below that of water.

In the first and early stages of the counter-flow treatment, that is, at and near where the ingoing material enters and where the outgoing solvent passes out, the material is in contact with a two-phase liquor, one phase being solvent admixed with water entering with the ingoing material and the other phase being fat.

In the latter and last stages of the counter-flow treatment, that is, at and near where the new or clean solvent enters and where the treated material passes out, there is little or no water in the solvent and the solvent dissolves the remaining fat from the material. In other words, the solvent has a definite affinity for mixing with and removing water so long as water is present but after the water has been removed it has definite affinity for fat and will thereupon remove substantially the remaining fat.

Fat which is dissolved from the material in the latter and last stages is set free from solution or thrown out into a separate phase as the solvent becomes mixed with the water entering with the material in the first stage.

The outgoing liquor from the overall treatment which is similar to the liquor in contact with the ingoing material at and near where it enters, is a two-phase liquor, one phase being substantially solvent admixed with water and the other phase being substantially fat.

It is found, when carrying out the process of this former invention, that the flavor or taste and smell components can be removed from the material by a proper choice of solvents. This is because such components are soluble in the mixture of solvent and water which results from the solvent becoming admixed with the water entrapped in the ingoing material at the time of its introduction to the process.

In many cases, it is highly desirable and valuable to remove flavor components so as to get solid end-products substantially or entirely free from the flavor of the protein-containing material.

However, if the protein-containing material is relatively dry, the process of the former invention cannot remove the flavor components because there occurs no suitable mixture of solvent and water at and near where the ingoing material enters and where the outgoing solvent passes out. Further, if the solvent is used only to remove the fat from the dry materials the outgoing liquor is in single phase which is expensive to separate whereas when water is added not only are the flavor components dissolved but the outgoing liquor is in two phases with the valuable oils freely separable from the water, solvent and flavor components.

It has been found that the object of the present invention, namely, the removal of fats and other components from relatively dry materials, can be achieved on an economical scale by the counterflow treatment of the material in a comminuted form with an organic solvent or mixture of solvents by adding water to the dry material before treatment or adjusting the water content at at least the first stage of the treatment to ensure that the solvent will have opportunity to contact and to extract the flavor components, it having been ascertained that the solvent alone without the addition of water will not dissolve the flavor components.

This is quite a different concept from the process of Patent No. 3,076,708 in which the problem is to extract the water and fats in wet starter materials. In the present case the function of the water is to enable the solvent to extract the flavor components and thereupon to cause the liquid composed of water, solvent, flavor components and fat to separate into two phases thus making it feasible to recover the fats in a very economic manner.

Whether or not the outgoing extraction liquor from the counterflow treatment exists in two liquid phases is governed by the temperature, complex aspects of the physical and organic chemistry of the components of the system, the amount of backflow liquor in relation to the amount of forward flow solid material, as well as the amount of fat in the raw material. Consequently the amount of water to be added to obtain the best results can be best determined by experiment after the appropriate solvent has been selected, thus permitting proper recovery of the oils also by reason of the two phase relation.

The selection of solvent may be made within wide limits, regard being had to the nature of the material to be treated, the ultimate use of the treated material, and the costs involved. Acetone is a suitable solvent, as is a mixture of equal parts by volume of acetone, ethyl acetate, and ethyl alcohol. This latter mixture is particularly suitable for ensuring that substantially all the flavor components are removed from the material. It is considered preferable to avoid the use of cyclic hydrocarbons, chlorinated hydrocarbons, or other solvents which may be objectionable from the viewpoint of any harmful effects of fumes in regard to the health of operating personnel, or which may leave undesirable residues or taints in the end-products of the process.

Depending upon the nature of the flavor components in the particular raw material and the extent to which it is desired to remove them, the choice of solvent may be varied. For example, using acetone, it is found that the flavor components may be fairly substantially removed in the counterflow treatment, this taking place mainly in the early stages during which the acetone is mixed with water in proportions of the order of 30% to 10% by volume, but components not removed in the early stages may then still remain in the solid product during and after the latter stages, in which the water content of the acetone may diminish from about 10% down to about 2%.

On the other hand, a solvent such as an equal mixture by volume of acetone, ethyl alcohol and ethyl acetate, is found to dissolve flavor components not only during the early stages when admixed with say 30% to 10% by volume of water but, also, in the latter stages when admixed with say 10% down to 2% or less by volume of water. A solvent of this kind is particularly valuable if it is desired to get very thorough extraction of flavor components.

It is desirable to keep the amount of solvent to a minimum in order to keep solvent recovery costs down. For practical purposes the ratio of solvent in backflow to solid material in forward flow is of the order of 1½ to 6½ parts by weights of solvent to one part by weight of solid. To obtain an adequate phase separation the water-solvent mass ratio must be about ½ to ⅓ which means the water-solid ratio for stage 1 will be well within the limits of 0.50 to 2.25, i.e., 50% to 225% of the dry weight of the material.

The degree of comminution of the material to be treated should be sufficient to enable the solvent to penetrate into the particles to achieve the desired degree of extraction of the fat or oil and/or other components.

It has been found that some of the vegetable materials such as copra, peanuts and cocoa nibs are not readily penetrated by the solvent unless the particle size is reduced to approximately 0.01 inch (approximately 0.25 mm.).

In cases where thorough extraction is desired, it appears that, generally speaking and with most types of materials, the particle size should be reduced to approximately 0.01 inch (approximately 0.25 mm.).

It is also found that many of the raw materials which are of a fatty or oily nature are difficult to comminute to a small particle size. In these cases, that is, copra, peanuts, cocoa nibs, soybeans, cottonseed, safflower seed and the like, it is found practicable to work with the feed material in a minced or flaked condition in the first or early stages of the countercurrent system and to follow this with a secondary and finer comminution in the presence of the solvent, so that the latter stages of the countercurrent system are operated with a solid particle size approximately 0.01 inch (0.25 mm.). In such fine materials as rice pollard a second comminution will not be necessary.

The temperature of the materials is important to the extraction of oil by the solvent. For example, tests have indicated that the solubility of oil in solvent containing 10% water is of the order of 0.25% at ambient temperature while at 50° C. the solubility is of the order of 2.5%. Solubility of the oil in aqueous-solvent mixtures indicates good solubility in stages 3, 4, 5, and 6 in a six stage process. The temperature of the material should thus be maintained at around 50° C. throughout all stages of the process for optimum results.

The various features of the invention will be better understood by reference to the following specific examples.

Example I

There was used as raw material, shredded copra, in a six-stage countercurrent treatment, the solvent being acetone. Each stage consisted of agitating the mixture of copra with the solvent liquor in a vessel for a period of approximately five minutes at temperature of approximately 50° C., then filtering and squeezing the liquor from the solid matter, and moving the solid matter forward to the subsequent stage vessel, and passing the liquor backwards to the previous stage vessel. Each quantity of forward flow material entering the first stage was 30 grams of copra and to it was added 15 milliliters of water during the first stage of the treatment. Each quantity of acetone entering the last stage as backflow was approximately 45 milliliters of acetone in relation to each 30 grams of copra forward flow. The countercurrent system was brought into equilibrium conditions by rejecting the first several batches of outgoing solid product and of outgoing liquor. In the fourth stage, the mixture of solid matter and liquor was transferred for finer comminution to a disintegrator with high speed rotating cutter blades and then transferred back to the fourth stage vessel.

The outgoing solid product from eight batches, equivalent to 240 grams of ingoing copra, was combined and, after removal of entrained solvent by evaporation, weighed approximately 53 grams. This product was milled into a fine powder, almost pure white, and it had no detectable flavor of copra.

The outgoing extraction liquor from eight batches was combined, and it consisted of two phases, the one being all or substantially all oil and the other being all or substantially all solvent-water with dissolved flavor components. The total volume of liquor was approximately 400 milliliters and to this was added a further 200 milliliters of water.

The solvent was removed from the two-phase liquor by fractional distillation, leaving behind a two-phase liquor consisting of oil and water, the latter with dissolved flavor components and a small amount of suspended solid matter.

The oil was separated by centrifuging and was then filtered. It weighed approximately 164 grams and was almost water-white and had the appearance and character of high grade coconut oil.

The aqueous phase containing the dissolved and suspended matter was concentrated by evaporation to yield a brown mixture of syrup and solid matter weighing approximately 21 grams and which had an intense flavor resembling coconut.

Example II

In a manner similar to Example I above, a quantity of peanuts was so treated, the solvent being acetone. The peanuts were first roasted and the shells and red skins were removed and discarded. The peanut kernels were disintegrated to particle size of the order up to approximately 0.1 inch (2.5 mm.). At the fourth stage of the counter-current system, the solid matter was subjected to a finer comminution in the presence of the liquor. Similar phase conditions existed throughout the system as in Example I.

From 240 grams of peanuts, the following products were obtained.

(a) A quantity of approximately 105 grams of solid product, very pale yellow in color and without any significant flavor of peanut.

(b) A quantity of approximately 117 grams of peanut oil of apparent high quality; and (c) A quantity of approximately 19 grams of a brown mixed syrup and solid matter with a taste resembling peanuts.

Example III

A quantity of cocoa nibs was treated in a manner similar to Examples I and II above, except that in this case the solvent used was an equal mixture by volume of acetone, ethyl alcohol and ethyl acetate, previously purified by fractional distillation from a dilute aqueous solution of sodium hydroxide. The phase conditions were similar to the previous examples including the addition of water in the first phase. The following products were obtained from 240 grams of cocoa nibs:

(a) Approximately 75 grams of solid product of pale brown color and no significant flavor of cocoa.

(b) Approximately 125 grams of a fat, pale cream in color, of the normal nature of cocoa butter; and (c) A mixed syrup and solid matter having a flavor of the nature of cocoa nibs.

Example IV

An eight stage countercurrent solvent system was used to extract safflower seeds. The solvent was a mixture comprising equal volumes of ethyl alcohol, ethyl acetate and acetone.

Each batch was 500 g. of seed. Water was added to the seed and mixed with stage 2 liquor to form stage 1. The total water to solvent mass ratio was approximately ½. By "total water" is meant that inherent water of constitution of the seed was included.

The seed was crushed (or chopped) in the solvent-water mixture and then reacted hot (50° C.) for five minutes after which the solids and liquids were separated. After the third stage and before the fourth stage extraction the solids were recomminuted by disintegrating in the presence of the solvent.

Eight hundred mls. of fresh solvent were added to the solids from stage 7 to stage 8. This was the only addition of solvent and the water addition to stage 1 was the only water addition to the process.

The liquors separated into two phases for stages 1–6 inclusive (stages 4–6 by cooling) and stages 7 and 8 remained as a clear solution.

All separated oil from 7 batches was combined and desolventised by steam distillation. A total of 994 g. of unrefined oil was recovered. In addition, distillation of all solvent liquors from the last batch recovered 121 g. of oil from solution. The total recovered oil, therefore, was 1,150 g. from an input of 3,500 g. seed, a yield of approximately 33 percent. This oil contained 0.65% F.F.A. (as oleic acid).

The solid residue was desolventised by heating in a forced circulation air oven at 65° C. and under vacuum (755 mm.) at 65° C. A total weight of 2,003 g. of dry solids were recovered and these were screened into three products, viz.

```
                                                    G.
+22 mesh (B.S.S.) (hulls) _____ 1,112
−22+100 mesh (bran) _____   409
−100 mesh (flour) _____   482
```

Analyses of the bran and flour were:

```
                                                Percent
Crude protein (N x 6.25) in bran _____  20.0
Crude protein (N x 6.25) in flour _____  63.1
Total amino acids in flour _____  59.6
Residual oil in flour _____   0.8
```

The aqueous liquors remaining after distillation of the solvent were concentrated by evaporation to a thick syrup. This syrup had an extremely bitter taste.

The protein products produced were tasteless. Comparison with meal produced by hexane extraction revealed the bitter flavor of the safflower seed was retained in the meal when oil was extracted by hexane.

Example V

An 8 stage countercurrent solvent system was used to extract soybeans. The solvent was a mixture of equal volumes of ethyl alcohol, ethyl acetate and acetone. Batches of 450 g. of soybean were processed as follows:

Three hundred grammes of water and stage 2 liquor (900 g.) were mixed with the incoming soybean (450 g.). The soybean was comminuted in this solvent-water mixture then reacted hot (50° C.) for 5 minutes after which the solids and liquid were separated. The solid portion contained about an equal weight of retained liquid and this was further processed in the subsequent stages of the countercurrent system. The general reaction temperature was 50° ± 5° C. and the reaction period was 5 minutes. The liquid (stage 1 liquor) contained approximately 30 percent water by mass, and other components in solution. The solvent was recovered by distillation and the "other components" were concentrated in an aqueous extract.

After stage 3 and before the 4th extraction the solid was recomminuted by high speed disintegrator in the presence of the solvent in order to reduce coarse particles to a finer size for more efficient oil extraction.

The only addition of fresh solvent was 900 g. to the solids from stage 7 to form stage 8. The only water addition to the system was made in stage 1. Because of the countercurrent equilibria established the respective percentages of water in the liquor of stages 1 to 8 were approximately 30, 10, 5.5, 4.5, 4.1, 4.0, 4.0, 4.0 when the fresh solvent contained 4.0 percent water by mass.

Oil separated from the solvent to form a second phase in stages 1–7 inclusive (only by cooling stages 5–7). Most oil was recovered from stage 4. The combined oil was stripped of residual solvent by steam distillation and then dried at 120° C. The oil which remained in solution in the liquors of stages 2 to 8 inclusive was recovered from the combined aqueous-solvent liquors of the final batch by distillation of the solvent. This oil was added to that recovered by phase separation. The total oil recovered was 320 g. from 2,250 g. soybean i.e. a yield of 14.2% of the soybean. The oil was of high quality, apparently free of gum and contained 0.22 percent free fatty acid expressed as oleic acid.

The solid residue from stage 8 was desolventised by heating in a forced circulation air oven at 65° C. and finally under a vacuum (755 mm.) at 65° C. A total of 1,470 g. of dry solids were recovered. This was screened into 3 sizes which were analyzed separately for crude protein and residual oil with the following results.

|  | Fraction wgt. (g.) | N x 6.25 = Crude protein (percent) | Residual oil (percent) |
| --- | --- | --- | --- |
| +44 mesh | 78 | 21.6 | 0.78 |
| −44 +60 mesh | 141 | 46.0 | 1.49 |
| −60 mesh | 1,251 | 61.1 | 1.47 |

Analyses of the solid product indicated the anti-tryptic digestive inhibitor and urease, both normally present in soybean meal, were removed from the meal without resorting to a "toasting" technique to destroy or inactivate them. The meal consequently consisted of a higher grade protein because heat damage had been avoided.

The aqueous extract after solvent recovery from stage 1 liquor contained a thick yellowish emulsion. This emulsion was soluble in alcohol, both hot and cold, and also in excess hexane.

After dissolving in hexane two products were obtained, (1) Water soluble material in an aqueous layer, and
(2) Hexane soluble (most probably gums and lecithins) in a hexane layer.

These products were recovered separately and yielded:

217 g. solid in the aqueous extract
16 g. gummy solid from the hexane extract.

The overall material balance for the process was:

| | G. |
|---|---|
| Input: Soybean | 2250 |
| Output: | |
| Dry solids | 1470 |
| Oil | 320 |
| Solids in aqueous extract | 217 |
| Solids in hexane extract | 16 |
| Water content and experimental losses (by difference) | 243 |
| | 2250 |

The normal water content of the soybean approximates 10 percent consequently the experimental balance was satisfactory.

A further batch was processed with intensive recomminution to examine the retention of oil related to particle size. The following results were obtained:

| Screen size (B.S.S.) | Percent of Solid Product | Protein (N x 6.25) | Oil content (percent dry solid) |
|---|---|---|---|
| +44 | 5.7 | 40.7 | 1.48 |
| −44 +60 | 11.0 | 34.6 | 0.44 |
| −60 +100 | 9.5 | 46.8 | 0.37 |
| +100 | 73.8 | 61.1 | 0.32 |

The apparently anomolous result for the +44 fraction is accounted for in the fact that this sample contained coarse bean particles while the earlier samples consisted of the hull only thus being lower in oil content.

These results indicate the essential requirement of effective size reduction which may require an efficient second comminution as an alternative to an intensive primary comminution.

The process is shown to be effective in producing higher grade protein products as well as simultaneously extracting an oil of superior quality.

*Example VI*

An 8 stage countercurrent solvent system was used to extract cottonseed kernels (meats). The solvent was a mixture of ethyl alcohol, ethyl acetate and isopropyl ether in the volume ratio of 4:2:1.

Ten batches of 200 g. cottonseed kernel were processed as follows:

Four hundred and twenty grammes of water were added to the kernels which were ground in a disintegrator to a thin creamy consistency. This quantity of water was required to permit effective grinding. This was mixed with 1,300 g. of stage 2 liquor and reacted hot (50° C.±5° C.) for 5 minutes after which the solid and liquid were separated. The solid which contained approximately an equal mass of liquid was further processed through the subsequent stages of the countercurrent system. The general process condition was 5 minutes retention at 50° C.±5° C. The liquid (stage 1 liquor) contained approximately 33 percent water by mass and other components in solution. The solvent was recovered by distillation and the soluble components were concentrated in the aqueous extract.

After stage 3 and before stage 4 extraction the solid was recomminuted by high speed disintegration in the presence of the solvent in order to reduce coarse particles to a finer size for more efficient oil extraction.

The only addition of fresh solvent was 1,300 g. to the solid from stage 7 to form stage 8. The only water addition to the system was made in the wet grinding of the kernels prior to mixing with stage 2 liquor to form stage 1. Because of the countercurrent equilibria the respective percentages of water in the liquor of stages 1 to 8 were approximately 33, 10, 5, 4.2, 4.1, 4.0, 4.0, 4.0 when the fresh solvent contained 4 percent of water by mass.

Oil separated into 2 phases in stages 1 and 2, but all oil separating in stage 2 was passed into stage 1 with the exception of the final batch when the oil which separated in stage 2 was removed prior to processing stage 1. When oil free stage 2 liquor was used for stage 1 no oil liberation was observed in this stage. Oil which was present as a separate phase in the total stage 1 liquors was retained with those liquors when the solvent was recovered by distillation and then separated from the aqueous extract. This oil was a very dark crude. Oil separated from the stage 2 liquor was stripped of solvent by steam distillation and dried at 120° C. under vacuum (755 mm.). This oil was light yellow and of apparent good quality. Its free fatty acid content was 0.34% expressed as oleic acid. The total oil recovered from 2000 g. of kernels was 444 g. Oil in solution in the final liquors was not recovered and represented a probable addition of 50 to 100 g. of oil.

The solid residues were desolventized by heating in a forced circulation air oven at 65° C. A total weight of 1,048 g. was recovered from 2,000 g. of kernels and screened into the following 3 products.

| | Wgt. (g.) | Percent of original kernel | Percent Protein (N x 6.25) | Residual oil, percent |
|---|---|---|---|---|
| Hulls & linters | 140 | 7.0 | | |
| Middlings (−30 +100 mesh) | 244 | 12.2 | 61.0 | 3.83 |
| "Flour" (−100 mesh) | 664 | 33.2 | 60.5 | 0.52 |
| | 1,048 | 52.4 | | |

Analysis of the "flour" for free gossypol indicated almost complete removal of this toxic component, the very low content of 0.005 percent being obtained.

Nitrogen solubility in 0.02 N sodium hydroxide by the method of Lyman, Chang and Couch (J. Nutrition 49, 679 (1953)) was 81.3% which is higher than that of most conventional cottonseed meals and is an indication of protein quality. The removal of free gossypol by dissolution rather than binding it chemically to an essential amino acid (lysine) also improves the quality of the resultant meal or protein "flour."

An additional batch of 200 g. was processed in the countercurrent system and the solids from each stage were analysed for oil retention and free gossypol. These results are shown as follows:

| State | Oil Content (Percent dry solids) | Free Gossypol (percent) |
|---|---|---|
| 1 | 32.4 | 0.03 |
| 2 | 14.3 | 0.01 |
| 3 | 6.4 | 0.01 |
| 4 | 2.3 | 0.01 |
| 5 | 1.2 | 0.01 |
| 6 | 0.8 | 0.01 |
| 7 | 0.7 | 0.01 |
| 8 | 0.6 | [1] |
| Original kernal | | 0.84 |

[1] Less than 0.01.

These results indicate the effectiveness of the process (i.e., the aqueous-solvent system) in removing other components, such as the toxic compound gossypol, from the solid product. The protein product was tasteless, odorless and suitable for consumption by all monogastric animals and human beings. Also by application of oil recovery from stage 2 solvent liquor the removal of gossypol from the crude oil is virtually complete. Consequently both meal and oil obtained by the process were of improved quality.

The aqueous extract after solvent recovery from stage 1 liquor was concentrated. A thick "pitchy" layer separated from the aqueous solution during concentration. This was recovered separately from the aqueous concentrate which consisted mainly of polysaccharides and water soluble coloring matter. The extracts recovered were:

|  | G. |
|---|---|
| "Pitchy" material | 103 |
| Polysaccharide material | 142 |

The total material balance was satisfactory when allowance was made for oil in solution in the liquors.

| Recovery accounted for: | G. |
|---|---|
| Solids | 1048 |
| Oil | 444 |
| Extracts (total solids) | ¹ 223 |
|  | 1715 |
| Unaccounted | 285 |
|  | 2000 |

¹ Inherent water, experimental losses, and oil in solution.

*Example VII*

A six stage countercurrent solvent system was used to extract ground nut kernels. The solvent was a mixture of ethyl alcohol, ethyl acetate and isopropyl ether in the volume ratio of 4:2:1.

Four batches of 250 g. of kernels were processed as follows:

Five hundred and twenty grammes of water were added to each 250 g. kernels which were ground to a thin creamy slurry with a total water content of 70 percent. This was mixed with 1,620 g. of stage 2 liquor and reacted hot (50°±5° C.) for 5 minutes after which the solid and liquid were separated. The solid, which contained approximately an equal mass of liquid, was further processed through the subsequent stages of the countercurrent system. The general conditions were reaction time 5 minutes, reaction temperature 50°±5° C. The liquid (stage 1 liquor) contained approximately 33% water by mass and other components in solution as well as oil which formed a separate phase. The liquor was distilled for solvent recovery. The oil and other components were retained in the aqueous extract.

After stage 3 and before stage 4 extraction the solid was recomminuted in the presence of the solvent to ensure a fine particle size and adequate oil extraction.

The only addition of solvent to the system was 1,620 g. to the solid from stage 5 to form stage 6. The only water addition to the system was to the kernels, prior to stage 1.

The countercurrent equilibria established the respective mass percentage of water in the liquor of stages 1-8 as approximately 33, 10, 5, 4.2, 4.1, 4.0 when the fresh solvent contained 4 percent of water by mass.

Oil separated into 2 phases in stages 1 to 3, but only on cooling in stage 3. Oil was passed into stage 1 from stage 2 with the stage 2 liquor and only from the last batch was oil specifically separated from the stage 2 liquor. Oil which separated from cold stage 3 liquor was also separated and combined with that from stage 2. Stage 1 oil was separated from the aqueous extract remaining after solvent recovery. This oil was pale yellow and contained 1.54% free fatty acid expressed as oleic acid. The oil separated from stages 2 and 3 was stripped by steam distillation and dried at 120° C., under vacuum (755 mm.). This oil was almost water white and contained 0.30% free fatty acid expressed as oleic acid. The total oil yield was 401 g. from 1,000 g. kernels. Oil remaining in solution and not recovered probably accounted for up to 100 g.

The solid residues were desolventized in a forced circulation air oven at 65° C. They were almost pure white, tasteless and odorless and suitable for use as a protein source for human beings. The total weight of dry product was 379 g. which was screened into 3 products which analysed as follows:

| Screen size (B.S.S.) | Wgt (g.) | Protein (N x 6.25) (percent dry solid) | Oil content (percent dry solid) |
|---|---|---|---|
| +60 mesh | 13.5 | 68.7 |  |
| −60 +100 mesh | 22.9 | 68.6 |  |
| −100 mesh | 342.6 | 70.9 | 0.17 |

The aqueous extract was concentrated to produce 97 g. of thick syrup which contained 79 g. solid matter, mainly polysaccharides and flavor components.

The material balance was as follows:

|  | G. |
|---|---|
| Solid products | 379 |
| Oil | 401 |
| Extract solids | 79 |
| Balance | ¹ 141 |

¹ Inherent water, oil in solution and experimental losses.

Since inherent water is from 4 to 7 and the oil in solution up to 10 percent, the balance was satisfactory.

An additional extraction using ground nut kernels containing 4 parts per million of aflatoxin B1, an extremely toxic product of the mould aspergillus flavus resulted in the production of a meal which was reported by The Tropical Products Institute, London, as qualitatively reporting "low or negative" aflatoxins and quantitatively reporting "less than 0.007 part per million B1."

The process therefore was effective in removing this toxic component from the solid while simultaneously producing a high quality oil.

*Example VIII*

An 8 stage countercurrent solvent system was used to extract rice pollard (the mixed rice bran and rice polish produced as a by product from polished rice production). The solvent was a mixture of ethyl alcohol, ethyl acetate and isopropyl ether in the volume ratio of 4:2:1.

Batches of 250 g. of rice pollard were processed as follows:

Six batches established an equilibrium system, the next two batches only were quantitatively considered and an additional batch was processed to determine oil extraction data.

Five hundred grammes of water were added to each 250 g. of rice pollard which was then mixed with 1,250 g. of stage 2 liquor to form stage 1. This was reacted hot (50°±5° C.) for 5 minutes then the solid and liquid were separated. The liquid (stage 1 liquor) contained oil, approximately 30 percent water by mass, and other components in solution. The solid, which contained approximately an equal mass of liquid, was further processed through the subsequent stages of the system. The normal extraction temperature was 50°±5° C.

The only addition of fresh solvent was 1250 g. to the solid from stage 7 to form stage 8. The only water addition to the system was that added to the rice pollard entering stage 1. Because of the countercurrent equilibria established, the respective percentages of water, by mass, in the liquor of stages 1 to 8 were approximately 30, 12, 6, 4.5, 4.2, 4.1, 4.0, 4.0 when the fresh solvent contained 4.0 percent water by mass.

Oil present in each stage liquor was passed with the liquor and before commencing the quantitative tests with batches 7 and 8, oil which separated from stage 2 liquor as a separate phase was removed. The oil yield was taken as that oil which separated from stages 1 and 2 during the quantitative series. Most of the oil separated was recovered from stage 2 but all oil which formed a separate phase was added together, stripped of solvent by steam distillation and dried at 120° C.

After distillation of the solvent from stage 1 liquor the aqueous extract was extracted with hexane to recover any residual oil. The oil was recovered by evaporation of the hexane, and stripping of residual hexane under vacuum (755 mm.) at 100° C.

The yield of primary oil as separated from the liquors was 77 g. from 500 g. rice pollard and this oil contained 1.8% free fatty acid expressed as oleic acid. The secondary oil (from hexane extraction of the aqueous extract) was 6.5 g. This oil contained 23.0% free fatty acid expressed as oleic acid.

The total dry weight of solid residue was 299.4 g. and this contained approximately 18 percent crude protein (N x 6.25).

The aqueous extract remaining after solvent recovery and hexane extraction was concentrated to a thick syrup. This contained polysaccharides and other soluble components equivalent to 64.2 g. of dry solid.

The experimental mass balance was:

|   | G. |
|---|---|
| Input: Pollard | 500 |
| Output: | |
| Solid | 299.4 |
| Oil | 83.5 |
| Extracted solids | 64.2 |
| Balance | [1] 52.9 |

[1] Inherent water and experimental losses.

Since inherent water approximated 10 percent, this balance was satisfactory.

The final batch was sampled after each two stages and the solid analyzed for oil content. These were as follows:

| After stage: | Oil content percent dry solid |
|---|---|
| 2 | 7.6 |
| 4 | 0.94 |
| 6 | 0.31 |
| 8 | 0.21 |

These results indicated efficient oil recovery with the advantage of low free fatty acid and therefore reduced refining loss.

The application of the process of the present invention to the treatment of the materials specified above results in the following advantages:

(i) With certain materials, such as seeds, which contain carbohydrate, the presence of water in the solvent causes swelling and assists in the penetration of the water compatible solvent into the materials.

(ii) The amount and nature of the flavor components removed by the solvent can be varied by an appropriate choice of solvent and/or by the presence of water in different proportions in the solvent.

(iii) If desired, by an appropriate choice of solvent and/or by attaining an appropriate proportion of water in the solvent, certain proteins of a water-soluble nature may also be extracted along with the flavor components.

(iv) By attaining a very thorough extraction of fat or oil and flavor components, the solid protein-containing product can be milled into a fine powder or flour of very good keeping characteristics. It appears that the fat or oil and the flavor components are relatively chemically unstable and are mainly responsible for spoilage of many natural or treated materials, and, if they are thoroughly extracted, the solid matter has little or no further tendency to spoilage. As examples, the solid products from copra and peanuts appear to have keeping characteristics about similar to cornflour.

(v) In the recovery of the fat or oil, the presence of water in the outgoing extraction liquor facilitates the total removal of the solvent from the fat or oil. For example, if the solvent is acetone and the outgoing liquor contains acetone and water in one phase and the fat or oil in a separate phase, when the acetone is removed by fractional distillation and by thereafter boiling off a very small amount of water, the fat or oil is virtually totally free of solvent. On the other hand, if water is not present and the fat or oil and solvent are in the one phase, it is much more difficult to remove the last of the solvent from the fat or oil, involving higher temperature and/or reduced pressure or a longer time and agitation.

(vi) Many natural or treated materials containing protein or mixtures of protein with other solid components such as carbohydrates possess oils and/or flavors which are objectionable or not needed or in too great proportion for the diets of particular animals or human beings. It is considered to be of great value that the protein and associated solid nutritious products can be produced free from the particular oil and/or flavor and thus be available for incorporation or admixture in any kind of diet needed or desired by the particular animal or human beings.

In carrying out the processes on a commercial scale, it is necessary or preferable to operate a counterflow system consisting of several stages and preferably automatically and continuously and at a temperature at or below the boiling point of the solvent and higher than the melting point of the fat or oil. The feed material should enter under sealed conditions such as a compacted screw feed of by a suitable pump, and the solid outgoing material should preferably pass out under sealed conditions.

A suitable type of apparatus is one such that the feed material enters suitably comminuted and in which each stage allows the agitation of the liquor and solid matter in a vessel followed by means of positively separating the solid from the liquor, while the solid matter is moved to a subsequent stage vessel and the liquor is moved to a previous stage vessel.

In carrying out the process wherein the feed material is relatively coarse and is comminuted further during the counterflow treatment, it is preferable to use two units of the type described in United States Patent No. 3,111,393 connected in series with a suitable comminution device in between. One suitable device is a machine based on the principle of the Jordan refiner used in the paper industry. Alternatively, the feed material may be fed in a minced or flaked condition into a machine such as described in said United States Patent No. 3,111,393, which is particularly suited for operation with a fatty or oily two-phase liquor and using sufficient stages, such as three stages, so that the liquor is then single phase. This being followed by a finer comminution in the presence of the solvent and after this, any suitable well known counter-current machine such as is ordinarily used in the extraction of soybeans or oil seeds with conventional hydrocarbon solvents.

The term "fat" used herein is intended to cover materials commonly known as fats which are solid at normal temperatures and those commonly known as oils which are liquid at normal temperatures.

I claim:

1. In a process for the removal of fats and other components from relatively dry proteinaceous materials having a moisture content not exceeding about 20% by weight and which is in comminuted form, the steps of introducing said material into an initial compartment where the temperature of the material is maintained at a point capable of substantially rendering its entrained fat, adding sufficient water to the material by the time it is in said initial compartment to cause the resultant liquor in said compartment to exist in two phases, one of said phases consisting of solvent and water while the other consists substantially of fat, the quantity of water added being also sufficient so that the flavor components of the starting material are substantially dissolved in the solvent and water phase, withdrawing this two-phase liquor from the initial compartment, conducting said material through at least one intermediate stage where it is subject alternately to agitation with solvent and forceful separation of material from solvent and to a final stage where it is subjected to solvent extraction, and introducing a counterflowing solvent into the material in said final stage, said solvent having a boiling point above the melting point of the fat and below the boiling point of water, in maintaining the temperature of said material during said intermediate stages also at or above the melting point of fat said solvent with its contained fat being then conducted in counterflow successively into contact with the oncoming material in the intermediate stages and thence into said initial compartment and conducting the material from said last stage to a final compartment for the further removal of solvent therefrom.

2. A process as claimed in claim 1 in which said material is subjected to fine comminution in one of the intermediate stages of the process.

3. A process as claimed in claim 1 in which the initial proteinaceous material in flake-like form and in which said material is subjected to fine comminution in one of the intermediate stages of the process.

4. The process as claimed in claim 1 in which the solvent is acetone.

5. A process as claimed in claim 1 in which the solvent consists of equal parts by volume of ethyl alcohol, ethyl acetate and acetone.

6. In a process for the removal of fats and other components from relatively dry proteinaceous materials of vegetable origin such as beans, seeds and nuts in their naturally harvested condition, the steps of reducing said materials to flake-like form, introducing said materials into an initial compartment where the temperature thereof is maintained at a point capable of substantially rendering its entrained fat, in adding to the material by the time it is in said initial compartment an amount of water between 50% and 225% of the dry weight of the material whereby the resultant liquor will exist in two phases one of which consists of solvent flavor components and water while the other consists substantially of fat, withdrawing this two phase liquor from the initial compartment while recovering the fat therefrom, conducting said material through at least two intermediate stages where its temperature is maintained in the region of 50° C. where it is subjected in both stages alternately to agitation with solvent and forceful separation of material and solvent, in comminuting said material to a size of the order of .01 inch between said stages, in conducting said material to a final stage, and introducing a counterflowing solvent into the material in said final stage, said solvent having a boiling point above the melting point of fat and below the boiling point of water, the amount of solvent introduced in the final stage being generally about two to three times the amount of water introduced not later than in the initial stage, said solvent with its contained fat being conducted in counterflow successively into contact with the oncoming materials in the intermediate stages and thence into said initial compartment, and in conducting the material from said last stage to a final compartment for the further removal of solvent therefrom.

References Cited by the Examiner
UNITED STATES PATENTS 3,076,708   2/1963   Cavanagh _____ 99—7

A. LOUIS MONACELL, *Primary Examiner.*

DAREN M. STEPHENS. *Assistant Examiner.*